United States Patent [19]

Janiszewski et al.

[11] Patent Number: 4,889,217
[45] Date of Patent: * Dec. 26, 1989

[54] MOTOR VEHICLE CLUTCH FOR A MECHANICAL, MULTIPLE-SPEED AUTOMATIC TRANSMISSION

[75] Inventors: Gzegorz Janiszewski, Angered; Thomas Sahlmen; Mats Nystrom, both of Gothenburg, all of Sweden

[73] Assignee: Ab Volvo, Gothenburg, Sweden

[*] Notice: The portion of the term of this patent subsequent to Oct. 6, 2004 has been disclaimed.

[21] Appl. No.: 98,875

[22] Filed: Sep. 21, 1987

[30] Foreign Application Priority Data

Sep. 24, 1986 [SE] Sweden .................... 8604041

[51] Int. Cl.$^4$ ............. F16D 25/063; F16D 25/11
[52] U.S. Cl. .................. 192/48.91; 192/70.23; 192/83; 192/85 C; 192/86; 192/87.18; 192/105 B
[58] Field of Search ............. 192/48.7, 48.91, 70.21, 192/70.23, 85 C, 85 F, 86, 87.14, 87.16, 87.17, 87.18, 87.19, 105 B, 83; 74/330, 334, 335

[56] References Cited

U.S. PATENT DOCUMENTS 2,202,378  5/1940  Hertrich ............... 74/330
2,811,053  10/1957  McKewen ............ 74/334
2,944,435  7/1960  Hendrickson ......... 74/335
4,697,677  10/1987  Janiszewski ......... 192/48.91

FOREIGN PATENT DOCUMENTS 2055489   5/1971  Fed. Rep. of Germany .
1751816   8/1971  Fed. Rep. of Germany .
84033471  12/1985  Sweden .
573057    2/1976  Switzerland .
609428    2/1979  Switzerland .
1237812   4/1986  U.S.S.R. ............... 192/85 C
791008    2/1958  United Kingdom .

Primary Examiner—Leslie A. Braun
Assistant Examiner—David A. Testardi
Attorney, Agent, or Firm—Young & Thompson

[57] ABSTRACT

A motor vehicle clutch is particularly suited for a mechanical multiple-speed automatic transmission. The clutch comprises a pair of alternatingly engageable clutch discs (5,7) mounted on a pair of concentric shafts (8,10). In addition to a centrifugal arrangement (29,30) for engagement when starting, the clutch comprises a hydraulic control system with a piston cylinder device (20) and two three-way magnetic valves (51,52), one (51) of which is capable of presure regulation and the other (52) has merely an on-off function.

3 Claims, 1 Drawing Sheet

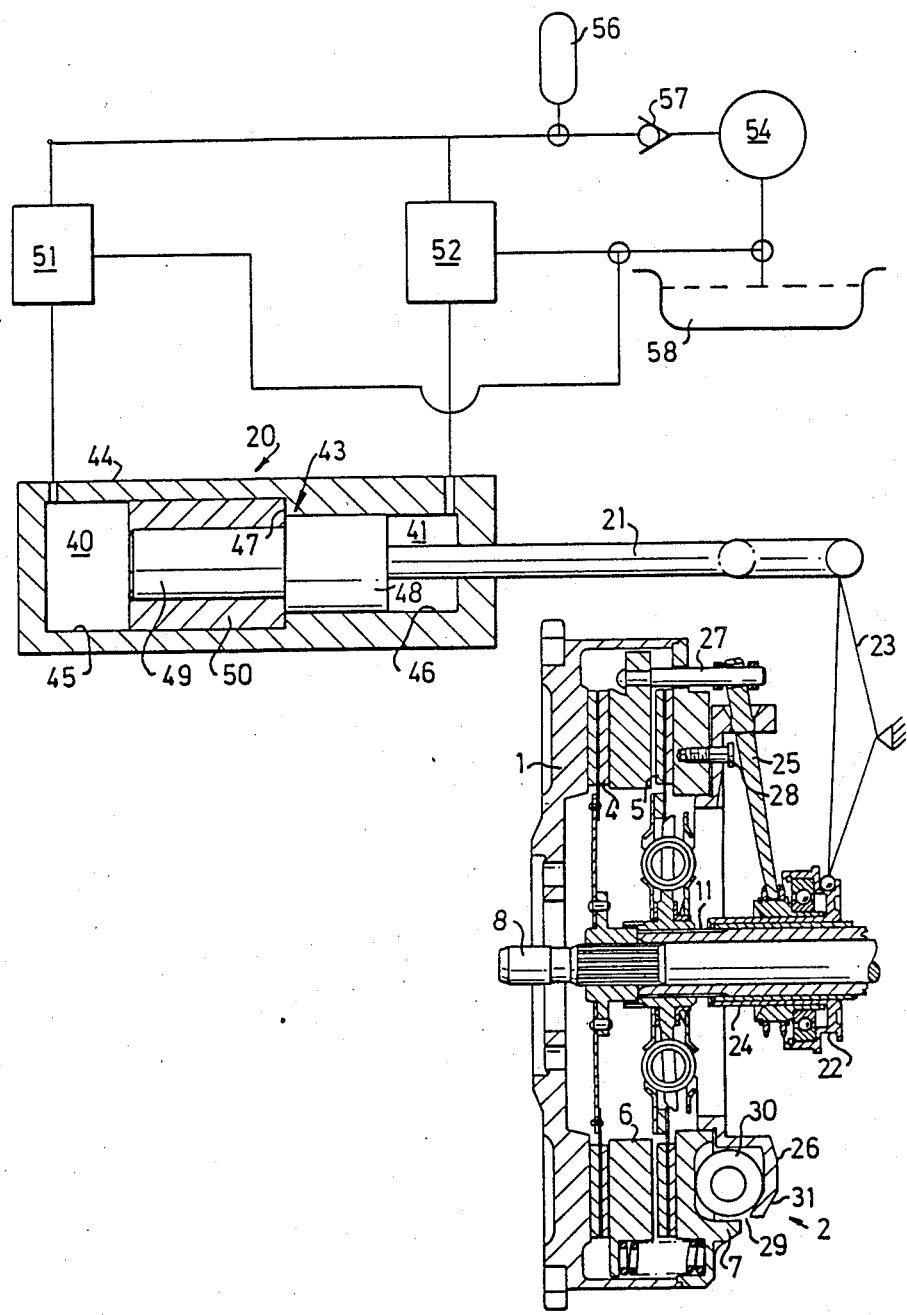

MOTOR VEHICLE CLUTCH FOR A MECHANICAL, MULTIPLE-SPEED AUTOMATIC TRANSMISSION

The present invention relates to a motor vehicle clutch, particularly for a mechanical, multiple-speed automatic transmission, comprising a clutch disc which is non-rotatably joined to an input shaft to the transmission, said disc being pressable against an engine flywheel by means of a drive plate which is axially displaceable but non-rotatable relative to the flywheel; a second drive plate which is solidly joined to the flywheel; a second clutch disc which is arranged between the drive plates and is non-rotatably joined to a hollow shaft which is concentrically mounted on said input shaft; and pressure-medium actuated control means comprising a piston-cylinder device by means of which the first drive plate is, on the one hand, alternately pressable against said clutch discs and, on the other hand, settable in an intermediate position in which both of the clutch discs are not loaded by the first drive plate; a centrifugal device being arranged which, when the first drive plate is set in said intermediate position, loads the first drive plate in the direction towards the second disc with a force dependent on the engine speed.

A clutch of this type is disclosed in U.S. Pat. No. 4,699,687 and is intended to be used together with a multiple speed automatic transmission of the type in which the engine torque is transmitted to the transmission drive gear via a double clutch. In a five speed gearbox, for example, the torque is transmitted via one portion of the clutch to the drive gears for second and fourth speeds. Shifting is done by preselection so that two drive gears are engaged at the same time. Prior to shifting from first to second, for example, the drive gear for second is engaged, whereafter the actual shifting is carried out by disengaging the clutch for first and engaging the clutch for second.

In the clutch shown in the above mentioned patent application, the setting of the first drive plate in the three different positions is controlled with the aid of a piston cylinder device, which in principle has three cylinder chambers (two at the ends and one intermediate) with individual communications to a hydraulic system not described in more detail here.

Depending on the clutch position, pressure medium is supplied to one of the cylinder chambers while the other two are drained to a reservoir. A system using a piston cylinder device of this type is relatively complicated and requires a number of valves of which more than one must be capable of pressure regulation.

The purpose of the present invention is to achieve a clutch of the type described by way of introduction with simplified control means, making it possible to set the first drive plate in its various positions using only two control valves, of which only one need have a pressure regulating function. The other only requires an on-off function.

This is achieved according to the invention by virtue of the fact that the piston cylinder device has a piston means and a cylinder bore such that when pressure medium of the same pressure is supplied at the same time to cylinder chambers on either side of the piston means, a portion thereof joined to a piston rod assumes an intermediate position in which the first drive plate assumes its intermediate position and that when pressure medium is supplied to only one or the other of the cylinder chambers, the portion of the piston joined to the piston rod assumes one of two end positions, in which the drive plate is pressed against one of the clutch discs.

The invention will be described in more detail with reference to an example shown in the accompanying drawing, which shows a longitudinal section through a clutch with a schematic drawing of a hydraulic control system connected thereto.

1 in the FIG. designates an engine flywheel, to which a clutch, generally designated 2, is connected, comprising a first disc 4, a second disc 5, a drive plate 6 non-rotatably but axially displaceably connected to the flywheel, and a drive plate 7 solidly joined to the flywheel. he disc 4 is joined to an input shaft 8 for second and fourth, while the disc 5 is joined to a hollow shaft 11 which is mounted concentrically to the shaft 8 for driving in the first, third and fifth gear speeds.

When driving in first, third and fifth, the movable drive plate 6 presses the disc 5 against the fixed drive plate 7, and the hollow shaft 11 is driven, while the shaft 8 is disengaged. Prior to shifting into second for example, preselection takes place by the intermediate shaft gear for the second gear speed being locked onto its intermediate shaft in a manner known per se, whereafter the actual shifting process itself takes place by the movable drive plate 6 being displaced to the left in the Figure, so that it releases the disc 5 and presses the disc 4 against the flywheel 1.

To achieve the displacement described above of the movable drive plate 6 between its different positions, the drive plate is connected to an actuating means in the form of a piston cylinder device 20, the piston rod 21 of which controls an engaging and disengaging bearing 22 via a fork 23. The bearing 22 is displaceable on a sleeve 24 and engages the radially inner ends of levers 25, which are pivotally mounted in a carrier plate 26. The radially outer ends of the levers 25 are pivotally joined to pins 27 securely anchored in the drive plate 6. The carrier plate 26 is attached to the fixed drive plate 7 with the aid of pins 28, which permit a limited axial displacement of the carrier plate 26 relative to the drive plate 7.

The carrier plate 26 and the drive plate 7 define between them a plurality of peripherally distributed, radially directed spaces 29 for centrifugal weights 30. The spaces 29 become narrower outwards because the radially outward portion 31 of the carrier plate is inclined towards the drive plate 7, so that the centrifugal weights 30 in their radially outward position press apart the carrier plate 26 and the drive plate 7.

The Figure shows the movable drive plate 6 in its intermediate position, which is achieved by in accordance with the invention, supplying simultaneously pressure fluid to the cylinder chambers 40,41 on either side of a piston means 43 in the cylinder 44 of the piston cylinder device 20. Said cylinder has one portion 45 of greater diameter and one portion 46 of less diameter and an intermediate abutment 47.

The piston means 43 consists of an inner portion 48 and a sleeve 50 slidably mounted on a narrower portion 49 thereof. Said sleeve 50 in the position shown in which both cylinder chambers 40,41 are pressurized, will be pressed against the abutment 47 and thereby provide the piston means with a defined intermediate position, in which the clutch is set in the position shown in the Figure, which is the starting position. The cylinder chambers 40,41 can be placed in communication via individual three-way magnetic valves 51,52 with a pressure source or with a reservoir 58. The pressure source comprises a pump 54, a non-return valve 55 and a pressure accumulator 56.

In the starting position shown, communication has been established between the two cylinder chambers 40,41 and the pressure source via the magnetic valves 51,52. Clutch engagement is now dependent on the engine speed and is effected with the aid of the centrifugal weights 30, which press the clutch disc 5 to the right in the Figure into engagement with the stationary drive plate.

When the car has started and the clutch disc 5 is in complete engagement, the magnetic valve 52 is switched to communicate with the reservoir 58 and the cylinder chamber 41 is thus drained. This results in a displacement of the piston portion 48 to the right with an accompanying displacement of the drive plate 6 to the right. The clutch 5 is now engaged regardless of the engine speed.

When shifting into second, the valve 52 is switched so that the cylinder chamber 41 is again pressurized. The piston means now once again assumes the intermediate position shown in the Figure, but since the rpm is greater than the starting rpm, the clutch disc 5 is still engaged. By means of the magnetic valve 51, which has a pressure-regulating function, there now takes place a gradual drop in pressure in the cylinder chamber 40, resulting in a displacement of the piston means to the left, thereby engaging the clutch pipe 4.

Shifting into third takes place by the valve 51 gradually increasing the pressure in the cylinder chamber 40, which, provided the rpm exceeds the starting rpm, results in the clutch disc 4 being released and the clutch disc 5 being engaged when the piston once again assumes its intermediate position. Subsequent draining of the chamber 41 via the valve 52 then results, as when starting in first, in engagement thereafter being independent of engine rpm.

It is evident from the above that this procedure can be accomplished with very simple means by using two magnetic valves 51,52, of which only valve 51 need be capable of pressure regulation in order to achieve soft engagement in all situations. The valve 52 only requires an on-off function.

We claim:

1. Motor vehicle clutch, particularly for a mechanical, multiple-speed automatic transmission, comprising: a clutch disc which is non-rotatably joined to an input shaft to the transmission, said disc being pressable against an engine flywheel by means of a drive plate which is axially displaceable but non-rotatably relative to the flywheel; a second drive plate which is solidly joined to the flywheel; a second clutch disc which is arranged between the drive plates and is non-rotatably joined to a hollow shaft which is concentrically mounted on said input shaft; and pressure medium-actuated control means comprising a piston-cylinder device by means of which the first drive plate is, on the one hand, alternately pressable against said clutch discs and, on the other hand, settable in an intermediate position in which both of the clutch discs are not loaded by the first drive plate; a centrifugal device being arranged which, when the first drive plate is set in said intermediate position, loads the first drive plate in the direction towards the second disc with a force dependent on the engine speed, the piston-cylinder device (20) having a piston means (43) and a cylinder bore (45, 46) and only two cylinder chambers (40, 41) such that when pressure medium at equal pressure is supplied at the same time to said cylinder chambers (40, 41) on either side of the piston means, a portion thereof joined to a piston rod (21) assumes an intermediate position in which the first drive plate (6) assumes its intermediate position and when pressure medium is supplied to only one or the other of the cylinder chambers, the portion (48) of the piston joined to the piston rod assumes one of two end positions, in which the drive plate is pressed against one of the clutch discs (4, 5), the control means comprising first and second valve means (51, 52) for regulating flow of pressure medium to and from the respective individual cylinder chambers (40, 41), one of said valve means being capable of pressure regulation to effect controlled gradual pressure change in its respective said cylinder chamber while the other valve means has only an on-off function.

2. Clutch according to claim 1, characterized in that the cylinder bore has a portion (45) of greater diameter and a portion (46) of smaller diameter and an abutment (47) at the transition therebetween, that the piston means comprises an inner portion (48) joined to the piston rod and an outer portion (49) with a sleeve portion (50) slidable thereon, and that the sleeve portion is mounted in the portion of the cylinder bore with greater diameter, while the inner portion has a part mounted in the cylinder bore portion of smaller diameter.

3. Clutch according to claim 2, characterized in that the valve means with pressure-regulating functions communicates with the cylinder chamber (40) formed of the cylinder bore portion of greater diameter, and that the second valve means (52) communicates with the cylinder chamber (41) formed of the cylinder bore portion of smaller diameter.

* * * * *